US007899004B2

(12) United States Patent
Ulupinar et al.

(10) Patent No.: US 7,899,004 B2
(45) Date of Patent: Mar. 1, 2011

(54) DISTRIBUTED PROTOCOL OVER A WIRELESS CONNECTION

(75) Inventors: Fatih Ulupinar, San Diego, CA (US); Gavin Bernard Horn, La Jolla, CA (US); Nileshkumar J. Parekh, San Diego, CA (US); Sumantra Chakravarty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 994 days.

(21) Appl. No.: 11/507,791

(22) Filed: Aug. 21, 2006

(65) Prior Publication Data

US 2007/0071000 A1 Mar. 29, 2007

Related U.S. Application Data

(60) Provisional application No. 60/710,365, filed on Aug. 22, 2005.

(51) Int. Cl.
*H04Q 7/00* (2006.01)

(52) U.S. Cl. .................. 370/328; 370/401; 370/466

(58) Field of Classification Search ......... 370/328–339, 370/400–401, 465–466
See application file for complete search history.

(56) References Cited

U.S. PATENT DOCUMENTS

| 5,978,386 | A * | 11/1999 | Hamalainen et al. ........ 370/466 |
| 6,385,174 | B1 | 5/2002 | Li |
| 6,894,994 | B1 * | 5/2005 | Grob et al. .................. 370/335 |
| 7,289,473 | B1 * | 10/2007 | Padovani et al. ............ 370/332 |
| 2001/0032325 | A1 * | 10/2001 | Fong et al. ..................... 714/18 |
| 2003/0002467 | A1 | 1/2003 | Leung |
| 2008/0020757 | A1 | 1/2008 | Hans et al. |

FOREIGN PATENT DOCUMENTS

| KR | 200270425 | 9/2002 |
| RU | 2224377 | 2/2004 |
| RU | 2316130 C2 | 1/2008 |
| TW | 533706 | 5/2003 |
| TW | 588521 | 5/2004 |
| WO | 9959364 A2 | 11/1999 |
| WO | WO0079721 A2 | 12/2000 |
| WO | 03079716 A1 | 9/2003 |

OTHER PUBLICATIONS

Bender et al, CDMA/HDR: A Bandwidth-Efficient High-Speed Wireless Data Service for Nomadic User, IEEE, 8 pages, Jul. 2000.*

(Continued)

*Primary Examiner*—Frank Duong
(74) *Attorney, Agent, or Firm*—Milan I. Patel; Nerrie M. Zohn

(57) ABSTRACT

The disclosure is directed to an access point in a wireless access network and methods for using an access point. The access point includes a transceiver function and a network function. The network function is configured to route packets between a packet-based network and the transceiver function. The transceiver function is configured to support a wireless connection with an access terminal, and provide protocol translation between the packets and physical frames transported over the wireless connection.

64 Claims, 7 Drawing Sheets

OTHER PUBLICATIONS

International Search Report, PCT/US2006/032769—International Search Authority—European Patent Office, Feb. 9, 2007.
International Preliminary Report on Patentability, PCT/US2006/032769—The International Bureau of WIPO—Geneva, Switzerland, Feb. 26, 2008.
Written Opinion, PCT/US2006/03769—International Search Authority—European Patent Office, Feb. 9, 2007.
European Search Report - EP10178419, Search Authority - The Hague Patent Office, Apr. 10, 2010.
Seong-Soo Park et al Performance improvements of TCP protocol for mobile data service, Global Telecommunications Conference, 1997. GLOBECOM 97, IEEE Publication Date: Nov. 3-8, 1997, vol. 3 pp. 1871-1875.
Taiwanese Search Report-095130915-TIPO-Dec. 16, 2009.

* cited by examiner

DISTRIBUTED PROTOCOL OVER A WIRELESS CONNECTION

CLAIM OF PRIORITY UNDER 35 U.S.C. §119

This application claims the benefit of the filing date of U.S. provisional application No. 60/710,365 filed on Aug. 22, 2005, entitled "A DISTRIBUTED METHOD AND APPARATUS FOR ACHIEVING WIRELINE RELIABILITY FOR CELLULAR COMMUNICATION SYSTEM," and assigned to the assignee hereof and hereby expressly incorporated by reference herein.

BACKGROUND

1. Field

The present disclosure relates generally to communication systems, and more particularly, to methods and systems employing a distributed protocol over a wireless connection.

2. Background

In conventional wireless communications, an access network is generally employed to connect one or more access terminals to a packet-based network, such as the Internet. The access network is typically implemented with multiple access points dispersed throughout a geographic region. The geographic region is generally subdivided into smaller regions known as cells with an access point in each cell. The access point generally includes a transceiver function that supports wireless connections with the access terminals in its cell. A network function may be used to interface the access point to the packet-based network. Alternatively, the network function may be integrated into the access points.

A common protocol used for transporting physical frames over a wireless connection is Radio Link Protocol (RLP). RLP is a Negative Acknowledgement (NAK) based protocol designed to lower the errors caused by disturbances in the wireless medium to a level acceptable for applications running over the Internet today. In current systems, the RLP operates between the network function and the access terminal. This design forces any wireless related optimizations, such as header or body compression to happen at the network function, rather than the edge of the access network, i.e., the transceiver function. This design also prevents the delivery of higher layer packets to the edge of the access network when the network function and transceiver function are not co-located, thereby increasing the NAK turnaround time due to backhaul delay to the network function. The inability to deliver higher layer packets to the edge of the access network may also result in stale data in various queues in the access point because higher layer packets that are dropped due to quality of service (QoS) may realistically only happen before the network function.

SUMMARY

An aspect of an access point is disclosed. The access point includes a transceiver function, and a network function configured to route packets between a packet-based network and the transceiver function. The transceiver function is configured to support a wireless connection and maintain a protocol instance over the wireless connection, the transceiver function being further configured to provide protocol translation between the packets and physical frames transported over the wireless connection, each of the physical frames including a header identifying the protocol instance performing the translation for the physical frame.

An aspect of a method for communications by an access point is disclosed. The access point includes a network function and a transceiver function. The method includes using the network function to route packets between a packet-based network and the transceiver function, supporting a wireless connection, and using the transceiver function to maintain a protocol instance over the wireless connection and provide protocol translation between the packets and physical frames transported over the wireless connection, each of the physical frames including a header identifying the protocol instance performing the translation for the physical frame.

An aspect a transceiver function is disclosed. The transceiver function includes means for exchanging packets with a network function in an access point, means for supporting a wireless connection, means for maintaining a protocol instance over the wireless connection, and means for providing protocol translation between the packets and physical frames transported over the wireless connection, each of the physical frames including a header identifying the protocol instance performing the translation for the physical frame.

An aspect of computer-readable storage medium containing a set of instructions executable by a processor in a transceiver function is disclosed. The instructions include code for exchanging packets with a network function in an access point, code for supporting a wireless connection, code for maintaining a protocol instance over the wireless connection, and code for providing protocol translation between the packets and physical frames transported over the wireless connection, each of the physical frames including a header identifying the protocol instance performing the translation for the physical frame.

An aspect of an access terminal is disclosed. The access terminal includes a transceiver configured to support a wireless connection with an access point, and a processor configured to maintain a protocol instance over the wireless connection separate and independent from protocol instances maintained by other access points. The processor is further configured to provide protocol translation between packets and physical frames transported over the wireless connection, each of the physical frames including a header identifying the protocol instance performing the translation for the physical frame.

An aspect of a method for communications by an access terminal is disclosed. The method includes supporting a wireless connection with an access point, maintaining a protocol instance over the wireless connection separate and independent from protocol instances maintained by other access points, and providing protocol translation between packets and physical frames transported over the wireless connection, each of the physical frames including a header identifying the protocol instance performing the translation for the physical frame.

An aspect of a processor for use in an access terminal is disclosed. The access terminal includes means for supporting a wireless connection with an access point, means for maintaining a protocol instance over the wireless connection separate and independent from protocol instances maintained by other access points, and means for providing protocol translation between packets and physical frames transported over the wireless connection, each of the physical frames including a header identifying the protocol instance performing the translation for the physical frame.

An aspect of computer-readable storage medium containing a set of instructions executable by a processor in an access terminal is disclosed. The instructions include code for supporting a wireless connection with an access point, code for maintaining a protocol instance over the wireless connection separate and independent from protocol instances maintained by other access points, and code for providing protocol translation between packets and physical frames transported over the wireless connection, each of the physical frames including a header identifying the protocol instance performing the translation for the physical frame.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments and is not intended to represent the only embodiments in which the concepts and techniques described herein may be practiced. The detailed description includes specific details for the purpose of providing a thorough understanding of various concepts and techniques. However, it will be apparent to those skilled in the art that these concepts and techniques may be practiced without these specific details. In some instances, well known structures and components are shown in block diagram form in order to avoid obscuring the concepts and techniques disclosed herein.

Various concepts and techniques will be described in this disclosure in the context of a RLP distributed across multiple access points in an access network. However, those skilled in the art will readily appreciate that these concepts and techniques may be extended to other protocols, such as a Signaling Link Protocol (SLP), Radio Link Control Protocol or the like. In one embodiment of an access point, the RLP functionality is moved down from the network function to the transceiver function. In this embodiment, the access point can maintain a separate and independent RLP instance over a wireless connection with an access terminal. As a result, the need to transfer the dynamic state of the RLP instance during handoff is eliminated because the target access point has its own RLP sequence space. In addition, higher layer packets can be forwarded to the edge of the network and compression can also be performed there.

Figure 1:
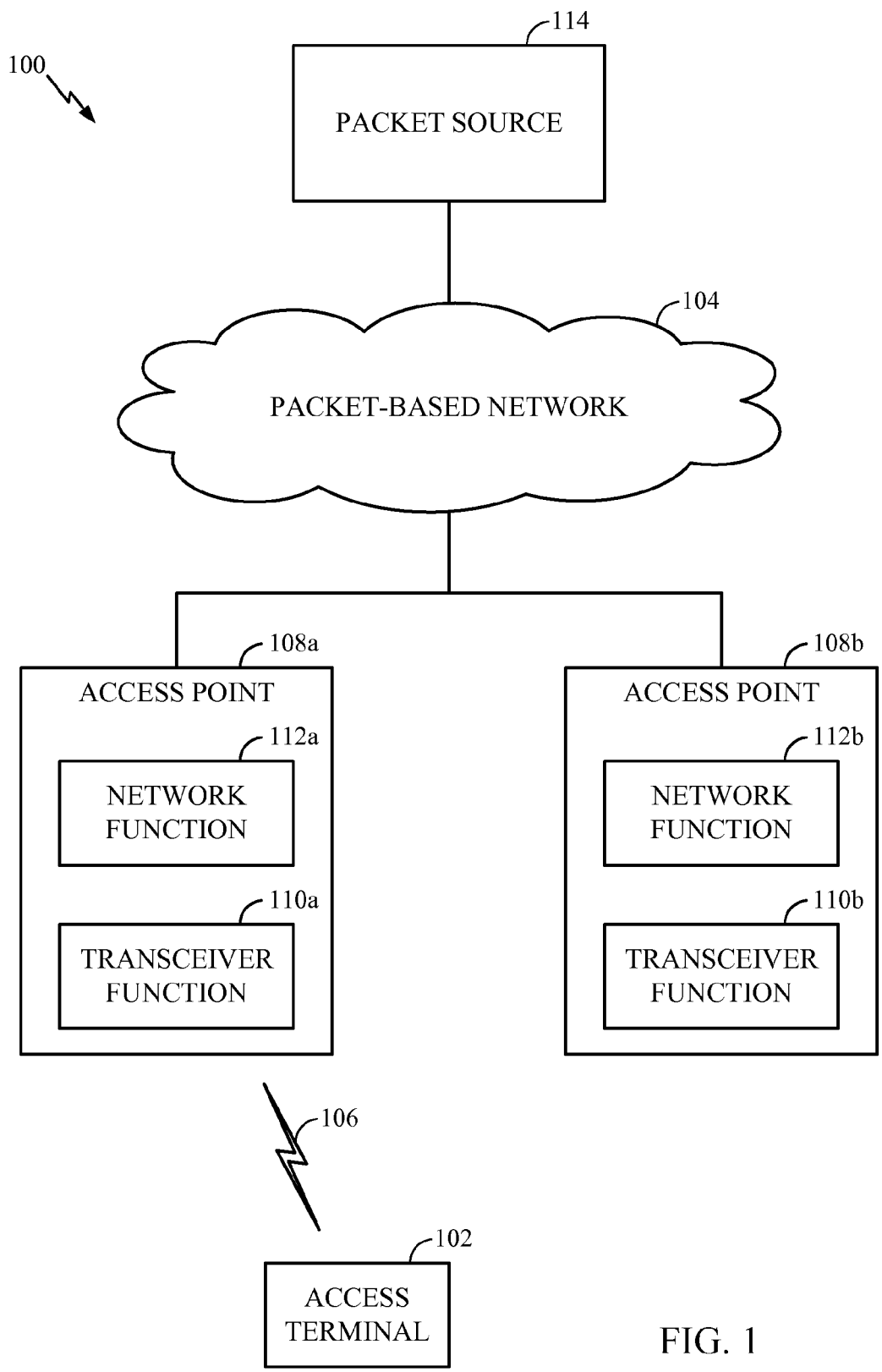
FIG. 1 is a conceptual block diagram of an embodiment of a communications system.

FIG. 1 is a conceptual block diagram of an embodiment of a communications system 100. An access terminal 102 is shown connected to packet-based network 104, such as the Internet, through a wireless access network 106. The access terminal 102 may be a wireless telephone, a laptop computer, a personal digital assistant (PDA), a pager, a camera, a game console, an audio device, a video device, or any other suitable wireless communications device.

The access network 106 may include multiple access points dispersed throughout a geographic region. The geographic region is generally subdivided into smaller regions known as cells with an access point in each cell. The cell is typically made up of three sectors, covered by an arrangement of antennas pointed in different directions. For purposes of illustration, two access points 108a, 108b are shown, however, any number of access points may be used to cover the geographic region of the communications system 100.

Each access point 108a, 108b includes a transceiver function 110a, 110b and a network function 112a, 112b. The transceiver function is used to maintain a wireless connection with the access terminal 102. In addition, the transceiver function maintains a RLP instance over the wireless connection that is separate and independent from the RLP instances maintained by other access points. With the RLP functionality in the transceiver function, the network function is limited to an Internet Protocol (IP) router.

Referring to FIG. 1, the access point 108a on the left is referred to as the "anchor" access point because it receives all packets from a packet source 114 addressed to the access terminal 102. The network function 112a in the anchor access point 108a is responsible for routing the packets to the access point currently in communication with the access terminal 102. In FIG. 1, the access terminal 102 is shown in communication with the anchor access point 108a, so all packets addressed to the access terminal 102 are routed to the transceiver function 110a in the anchor access point 108a. The transceiver function 110a maintains a wireless connection with the access terminal 102. A RLP instance over the wireless connection is also maintained between the transceiver function 110a and the access terminal 102. By maintaining the RLP instance on the network side at the transceiver function 110a, packets can be routed all the way to edge of the access network 106 before, for example, compressing the IP header or converting the packet to physical frames for transmission to the access terminal 102. NAK functionality can now be implemented at the transceiver function 110a, reducing the delay that might otherwise occur through the backhaul delay. In addition, packets may also be dropped at the transceiver function 110a to maintain QoS without generating unnecessary NAKs. Unnecessary NAKs are generated when the RLP sequence for a physical layer frame is assigned at the network function and the transceiver function drops the packet after the RLP sequence was assigned, resulting in missing data detected at the access terminal. The NAK is unnecessary since the packet was dropped due to QoS latency reasons and not due to disturbances in the wireless medium which the NAK was intended to correct.

The anchor access point 108a may also be referred to as the "serving" access point because it is serving as a connection point for the access terminal 102 to the packet-based network 104. As the access terminal 102 moves from left to right across FIG. 1, it may be handed off to the access point 108b to the right of the anchor access point 108a. This access point 108b is referred to as the "target" access point because it is the target of the handoff. During handoff, the access terminal 102 tears down the wireless connection with the transceiver function 110*a* in the anchor access point 108*a* and establishes a new one with the transceiver function 110*b* in the target access point 108*b*. A new RLP instance is also established between the access terminal 102 and the transceiver function 110*b* in the target access point 108*b*. The new RLP instance is separate and independent from the RLP instance used to support the transport of physical frames prior to handoff. As a result, the dynamic state of the RLP instance in the anchor access point 108*a* does not need to be transferred to the serving access point 108*b*. Once the handoff is complete, the target access point 108*b* becomes the serving access point for access terminal 102. Packets received by the network function 112*a* in the anchor access point 108*a* are routed to the transceiver function 110*b* in the new serving access point 108*b* for delivery to the access terminal 102.

Figure 2A:
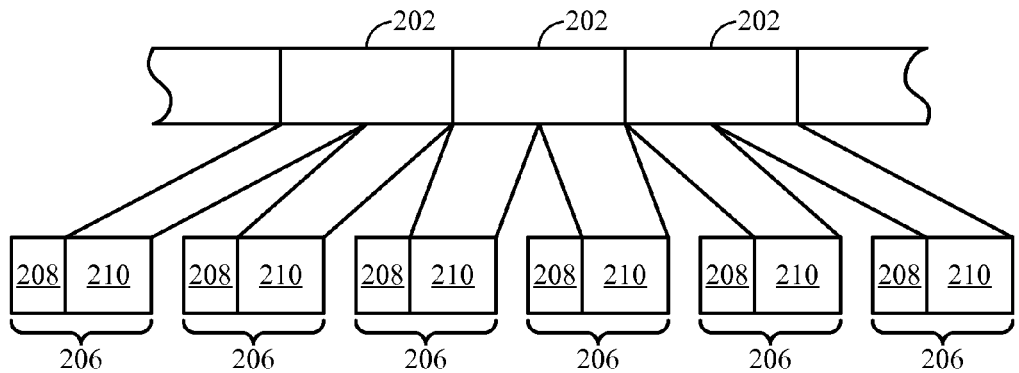
FIG. 2A is a conceptual diagram illustrating the conversion of a packet stream from a packet-based network to physical frames for transmission to the access terminal.

FIG. 2A is a conceptual diagram illustrating the conversion of a packet stream received from the network function to physical frames for transmission to the access terminal. In this example, each packet 202 is converted into two physical frames 206. Although not shown, a compression algorithm may be applied to each packet 202 before conversion. For example, the IP header may be compressed. Each physical frame 206 includes a header 208 and a payload 210. The headers contain sufficient information to recover the packet stream at the access terminal 102 (see FIG. 1). Included in the header 208 of each frame 206 is a RLP identifier that identifies the RLP instance. The payloads 210 contain the information in the packet.

Figure 3A:
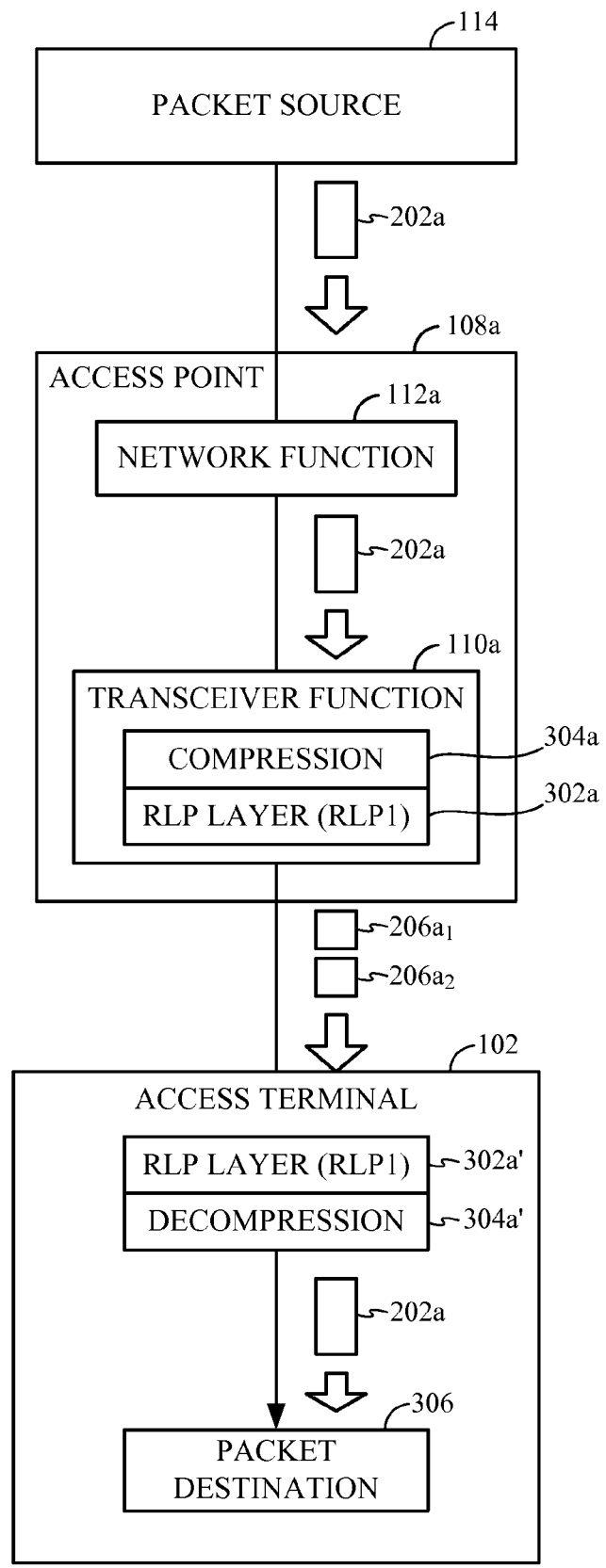
FIG. 3A is conceptual block diagrams illustrating the RLP functionality on the forward link.
Figure 3B:
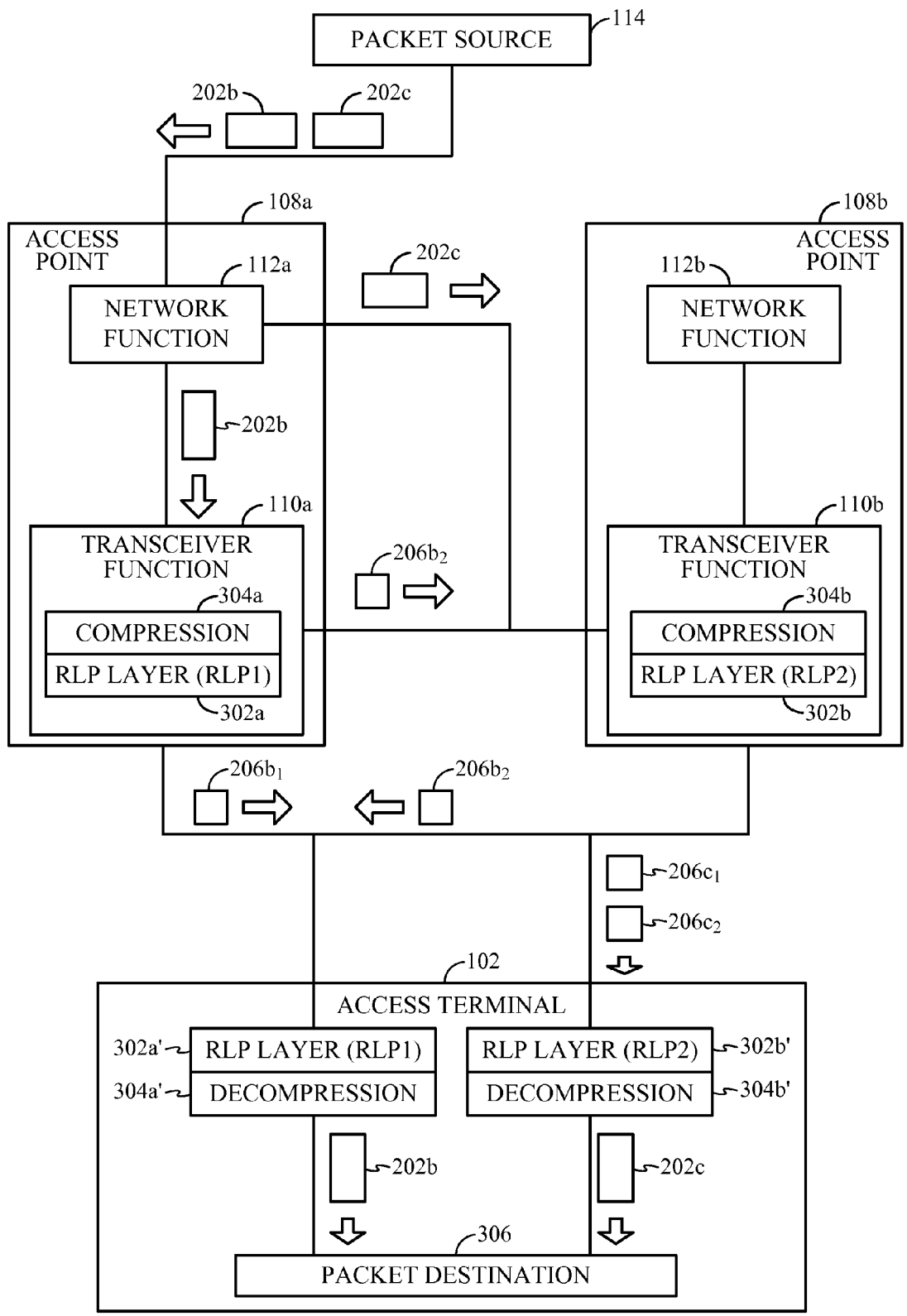
FIG. 3B is conceptual block diagrams the RLP functionality on the forward link during the handoff of an access terminal between access points.

Referring to FIGS. 3A and 3B, an example will now be given to illustrate the RLP functionality on the forward link. In FIG. 3A, the first packet 202*a* of a packet stream is delivered from the packet source 114 to the network function 112*a* in the anchor access point 108*a*. Since the anchor access point 108*a* is also the serving access point, the network function 112*a* routes the packet 202*a* to the transceiver function 110*a* in the anchor access point 108*a*.

The transceiver function 110*a* includes a compression layer 304*a* and a RLP layer 302*a*. The RLP layer 302*a* maintains a RLP instance with a RLP layer 302*a'* in the access terminal 102. The RLP layer 302*a* converts the compressed packet into two physical frames $206a_1$, $206a_2$. Each physical frame $206a_1$, $206a_2$ includes a header that identifies the RLP instance (RLP1) between the transceiver function 110*a* and the access terminal 102. The two physical frames $206a_1$, $206a_2$ are transported over the wireless connection to the access terminal 102.

The RLP layer 302*a'* in the access terminal 102 strips the headers from the physical frames $206a_1$, $206a_2$ and reassembles the payloads. The reassembled payloads are provided to a decompression layer 304*a'* to recover the first packet 202*a*. The first packet 202*a* is then routed to a packet destination 306.

In FIG. 3B, the second packet 202*b* of the packet stream is delivered from the packet source 114 to the network function 112*a* in anchor access point 108*a*. The network function 112*a* routes the packet 202*a* to the transceiver function 110*a* where it is compressed and converted into two physical frames $206b_1$, $206b_2$. Each physical frame $206b_1$, $206b_2$ includes a header that identifies the RLP instance (RLP1) between the transceiver function 110*a* and the access terminal 102.

At the same time the second packet 202*b* is being processed by the anchor access point 108*a*, or thereabouts, the access terminal 102 initiates a handoff from the anchor access point 108*a* to a target access point 108*b*. In this example, the first physical frame $206b_1$ is sent by the transceiver function 110*a* over the wireless connection to the access terminal 102 before the handoff. However, before the second physical frame $206b_2$ can be sent, the access terminal 110 is handed off to the target access point 108*b*. The handoff process includes establishing a wireless connection between the transceiver function 110*b* in the target access point 108*b* and the access terminal. A new RLP instance (RLP2) is also established between a RLP layer 302*b* in the target access point 108*b* and a RLP layer 302*b'* in the access terminal.

Following the handoff of the access terminal 102 to the target access point 108*b*, which is now the serving access point, the second physical frame $206b_2$ is routed by the transceiver function 110*a* in the anchor access point 108*a* to the transceiver function 110*b* in the serving access point 108*b*. The last byte in the first physical frame $206b_1$ may be retransmitted with the second physical frame $206b_2$ to effectively expire the flush timer used in conjunction with the NAK based protocol. The transceiver function 110*b* in the serving access point 108*b* then sends the second physical frame $206b_2$ over the wireless connection to the access terminal 102.

As shown in FIG. 3B, the access terminal 102 maintains two RLP instances during handoff: RLP1 with the transceiver function 110*a* in the anchor access point 108*a* and RLP2 with the transceiver function 110*b* in the serving access point 108*b*. When the access terminal 102 receives the second physical frame $206b_2$, it determines from the RLP identifier in the header that the payload belongs to the RLP instance identified as RLP1. The second physical frame $206b_2$ is then delivered to the RLP layer 302*a'* supporting that RLP instance (RLP1). The RLP layer 302*a'* reassembles the payload from the second physical frame $206b_2$ with the payload from the first physical layer $206b_1$, which was received from the anchor access point 108*a*. The reassembled payloads are provided to the decompression layer 304*a'* to recover the second packet 202*b*. The second packet 202*b* is routed to the packet destination 306.

In this example, the third packet 202*c* of a packet stream is delivered from the packet source 114 to the network function 112*a* in anchor access point 108*a*. The network function 112*a* routes the packet 202*a* to the transceiver function 110*b* in the serving access point 108*b*. The transceiver function 110*b* in the serving access point 108*b* provides the third packet 202*c* to the compression and RLP layers 304*b*, 302*b*, which function together to generate two physical frames $206c_1$, $206c_2$. Each physical frame $206c_1$, $206c_2$ includes a header that identifies the RLP instance (RLP2) between the transceiver function 110*b* and the access terminal 102. The two physical frames $206c_1$, $206c_2$ are transported over the wireless connection to the access terminal 102.

The RLP layer 302*b'* in the access terminal 102 strips the headers from the physical frames $206c_1$, $206c_2$ and reassembles the payloads. The reassembled payloads are provided to a decompression layer 304*b'* to recover the third packet 202*c*. The third packet 202*c* is then routed to the packet destination 306.

In the above example, the second physical frame $206b_2$ for the second packet 206*b* is received by the transceiver function 110*b* in serving access point 108*b* and sent to the access terminal 102 before the physical frames $206c_1$, $206c_2$ for the third packet 202*c*. Those skilled in the art will readily appreciate that the RLP functionality described in connection with FIGS. 3A and 3B would enable the access terminal 102 to recover the packet stream even if the physical frames are received out of order. More specifically, the transceiver function 110*b* in the serving access point 108*b* may receive the third packet 202*c* from the network function 112*a* in the serving access point 108 before receiving the second physical frame $206b_1$. In that case, the transceiver function $110b$ may convert the third packet $202c$ to physical frames $206c_1$, $206c_2$ and send the frames $206c_1$, $206c_2$ to the access terminal $102$ before sending the second physical frame $206b_2$ for the second packet $202b$. Today, a number of higher layer protocols exist, such as Transport Control Protocol (TCP) and the like, that can handle out-of-order packets.

As explained above, the RLP identifiers in the headers of the physical frames allow the access terminal $102$ to recover a packet stream that is sent via different RLP instances. In at least one embodiment, additional information may be included in the header. This information may be anything that is assists the access terminal $102$ to recover the packet stream. An example will be discussed with reference to FIG. 2B. In this example, the header contains multiple fields including the RLP identifier, a flow identifier, a sequence stamp, a begin bit, and an end bit.

The access terminal may be configured to support multiple sessions over the packet-based network. By way of example, the access terminal may be engaged in a voice call while simultaneously downloading a page from a web-site. The flow identifier may be used to identify the packet stream that the payload in each physical frame belongs to. In this example, all payloads created from voice packets may be assigned one flow identifier and all payloads created from data packets may be assigned another flow identifier. This allows the recovery of different packet streams at the access terminal. In addition it allows the transceiver function to service different packet streams according to different requirements in order to satisfy the QoS requirements for different types of applications.

Each RLP instance has its own sequence space from which sequence stamps may be generated. The sequence stamps may be based on the frame sequence, the byte sequence, or any other suitable sequence indicator that would allow access terminal to recover a packet stream. The sequence space is used for re-assembling the packets at the receiver. By way of example, the leftmost frame $206a_1$ in FIG. 2B may have a sequence stamp of n, indicating that the frame $206a_1$ is the $n^{th}$ frame in the packet sequence. The frame $206a_2$ to the immediate right may have a sequence stamp of (n+1), indicating that the frame $206a_2$ is the $(n+1)^{th}$ frame in the packet sequence, and the frame $206b_1$ to the immediate right of that may have a sequence stamp of (n+2), indicating that the frame $206c$ is the $(n+2)^{th}$ frame in the packet sequence.

As an alternative, the sequence stamp may be based on the byte sequence. In this example, the leftmost frame $206a$ in FIG. 2B may have a sequence stamp of n, indicating that the first byte in the frame $206a_1$ is the $n^{th}$ byte in the compressed packet stream. Assuming that the payload carried by each frame is p bytes, the frame $206a_2$ to the immediate right will have a sequence stamp of (n+p), indicating that the first byte in the frame $206a_2$ is the $(n+p)^{th}$ byte in the compressed packet stream. The frame $206b_1$ to the immediate right of that will have a sequence stamp of (n+2p), indicating that the first byte in the frame $206b_1$ is the $(n+2p)^{th}$ byte in the compressed packet stream, and so on.

The begin and end bit may be used to identify the first and last frames of a packet. By way of example, the begin bit may be asserted in the leftmost frame $206a_1$ to indicate that it is the first frame in the packet $202a$. The end bit may be asserted in the frame $206a_2$ to the immediate right indicating that it is the last frame in the packet $202a$. In this example, the begin bit is also asserted in the frames $202b_1$, $202c_1$, and the end bit asserted in the frames $202b_2$, $202c_2$.

Figure 2B:
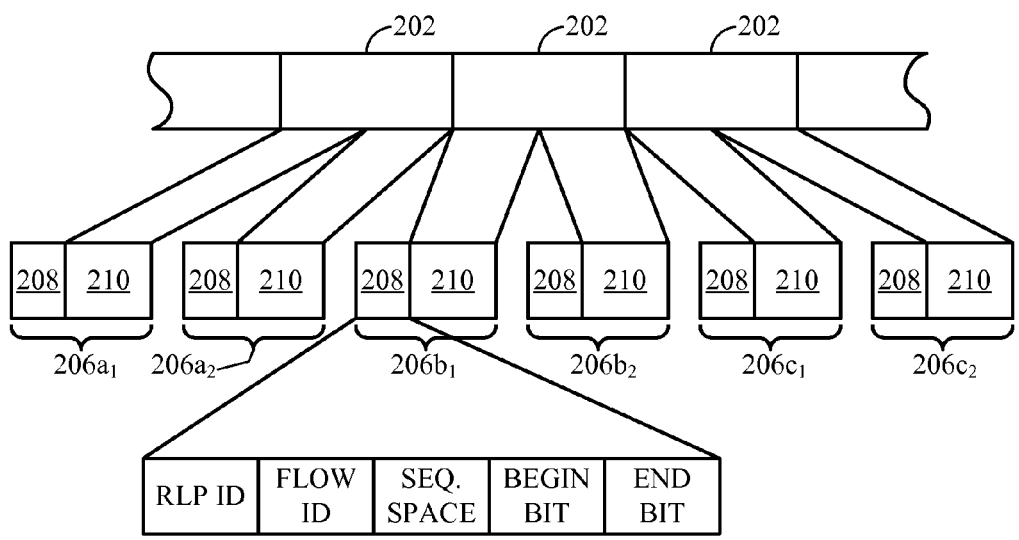
FIG. 2B is a conceptual diagram illustrating an example of fields in the headers of the physical frames in FIG. 2A.
Figure 2C:
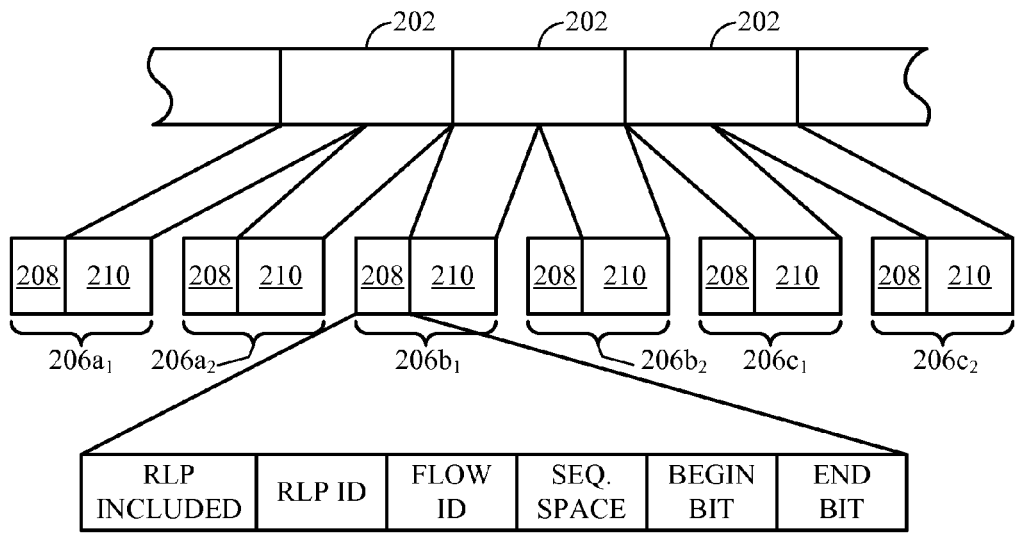
FIG. 2C is a conceptual diagram illustrating another example of fields in the headers of the physical frames in FIG. 2A.

An alternative header configuration is shown in FIG. 2C. In this example, the header contains a number of fields that are the same as shown in FIG. 2B including the flow identifier, the sequence stamp, and the begin and end bit. The difference between the two is that header shown in FIG. 2C includes a RLP included bit, and the RLP identifier is sent in the header only when the RLP included bit is asserted. As an example, the RLP included bit may be set only when a physical frame includes data from an RLP instance between the access terminal and the transceiver function in an access point that is not serving the access terminal, such as the case for the second physical frame $206b_2$ for the second packet in FIG. 3B. In this example, when the RLP instance for a physical frame is between the access terminal and the serving access point, such as the case for the physical frames for the first and third packets $202a$, $202c$, there is no need to send the RLP identifier.

Figure 4:
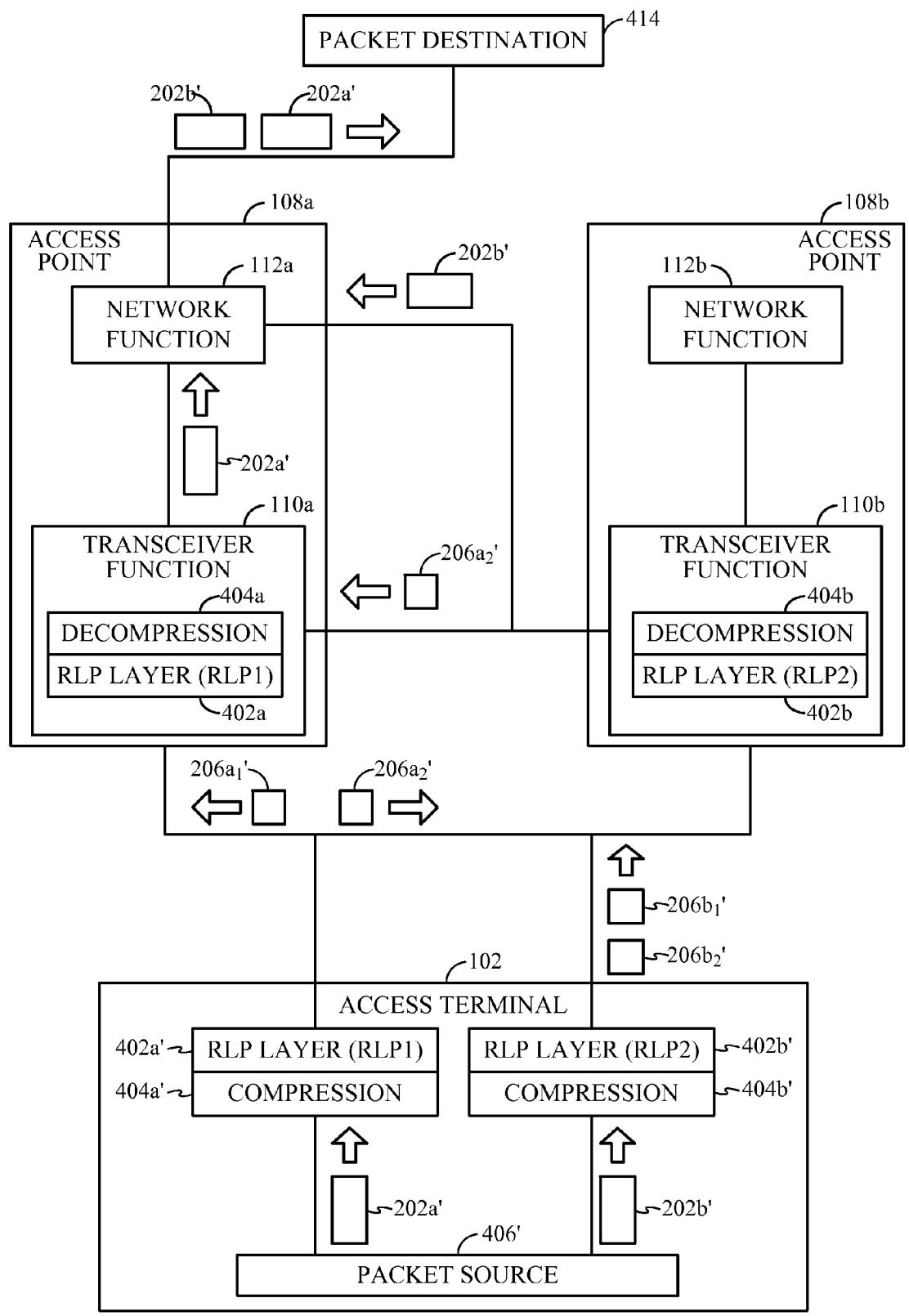
FIG. 4 is a conceptual block diagram illustrating the RLP functionality on the reverse link during the handoff of the access terminal between access points.

FIG. 4 is a conceptual block diagram illustrating the RLP functionality on the reverse link. In this example, the access terminal $102$ maintains a RLP instance with each sector in its active set, which includes the anchor access point $108a$ and the access point $108b$ to its right. Although not shown, each access point $108a$, $108b$ may use the same RLP instance when the access terminal $102$ is handed off between sectors, i.e. softer handoff. Since the same transceiver function serves all three sectors, the same RLP instance can be maintained during a softer handoff of the access terminal.

Referring to FIG. 4, a first packet $202a'$ from a packet source $406'$ in the access terminal $102$ is provided to the compression layer $404a'$ and the RLP layer $402a'$ supporting the RLP instance for the first packet $202a'$. The first packet $202a'$ is compressed by the compression layer $404a'$ and converted into two physical frames $206a_1'$, $206a_2'$ by the RLP layer $402a'$. Each physical frame $206a_1'$, $206a_2'$ includes a header that identifies the RLP instance (RLP1) between the RLP layer $402a'$ in the access terminal $102$ and the RLP layer $402a$ in the transceiver function $110a$ of the anchor access point $108a$.

The first physical frame $206a_1'$ is transported over the wireless connection to the RLP layer $402a$ in the transceiver function $110a$ of the anchor access point $108a$. However, before the second physical frame $206a_2'$ is output from the RLP layer $402'$, the access terminal $102$ is handed off to a target access point $108b$. Following the handoff of the access terminal $102$ to the target access point $108b$, which is now the serving access point, the second physical frame $206a_2'$ is transported over the wireless connection to transceiver function $110b$ in the new serving access point $108b$. The transceiver function $110b$ determines that the second physical frame $206a_2'$ belongs to the RLP instance (RLP1) between the RLP layer $402a'$ in the access terminal $102$ and the RLP layer $402a$ in the transceiver function $110a$ of the anchor access point $108a$. As a result, the second physical frame $206a_2'$ is delivered to the RLP layer $402a'$ in the anchor access point $108a$. The RLP layer $402a'$ reassembles the payloads from the two physical frames $206a_1'$, $206a_2'$ and provides them to the decompression layer $404a'$ to recover the first packet $202a$. The first packet $202a$ is then provided to the network function $112a$ in the anchor access point $108a$ for routing to the packet destination $414$.

The second packet $202b'$ is released from the packet source $406'$ in the access terminal $102$ after handoff, and therefore, the second packet $406'$ is delivered to the compression layer $404b'$ and the RLP layer $402b'$ supporting the RLP instance between the access terminal $102$ and the transceiver function $108b$ in the serving access point $108b$. The second packet $202b'$ is compressed and converted into two physical frames $206b_1'$, $206b_2'$. The physical frames $206b_1'$, $206b_2'$ are transported over the wireless connection to the RLP layer 402b in the transceiver function 110b of the serving access point 108b.

At the serving access point 108b, the payloads from the physical frames $206b_1'$, $206b_2'$ are reassembled by the RLP layer 402b'. The result is provided to the decompression layer 404b' to recover the second packet 202b. The second packet 202b' is routed to the network function 112a in the anchor access point 108a for routing to the packet destination 414.

Figure 5:
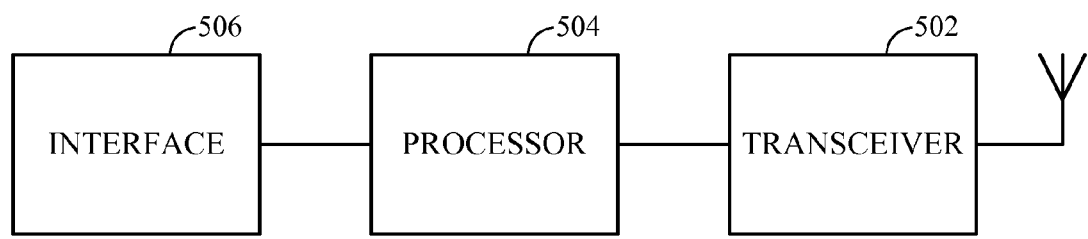
FIG. 5 is a conceptual block diagram illustrating an example of a wireless transceiver and processor.

FIG. 5 is a conceptual block diagram illustrating an example of a wireless transceiver and a processor. The wireless transceiver 502 and processor 504 may reside in the transceiver function of an access point or an access terminal. The wireless transceiver 502 is configured to support one or more wireless protocols. By way of example, the transceiver 502 may be configured to support code division multiple access (CDMA), wideband code division multiple access (WCDMA), time division multiple access (TDMA), frequency division multiple access (FDMA), orthogonal frequency division multiple access (OFDMA), World Interoperability for Microwave Access (WiMAX), Bluetooth, ultra wide band (UWB) protocol, home radio frequency (HomeRF), Ethernet, wireless fidelity alliance (Wi-Fi Alliance), 802.11 network technology, or any other suitable wireless technology, or any combination thereof.

The transceiver 502 is controlled by a processor 504. The processor 204 may be implemented with a general purpose processor and memory for storing data and instructions for software programs. The software programs may be used by the general purpose processor to provide compression and RLP functionality, as well as provide other communication and processing functions. The software programs may also provide an interface 506 to the general purpose processor. Alternatively, the interface 506 may be a separate entity. When operating in a transceiver function, the interface 506 communicates with a network function. When operating in an access terminal, the interface 506 may be used to communicate with various user devices such as a keypad and display. The processor 502 may also include a digital signal processor (DSP) with an embedded software layer to offload various signal processing functions, such as convolutional encoding, modulation and spread-spectrum processing. The DSP may also perform vocoder functions to support telephony applications. Alternatively, the processor 504 may be implemented with one or more application specific processors. The manner in which the processor 504 is implemented will depend on the particular application and the design constraints imposed on the overall system. Those skilled in the art will recognize the interchangeability of hardware, firmware, and software configurations under these circumstances, and how best to implement the described functionality for each particular application.

Figure 6A:
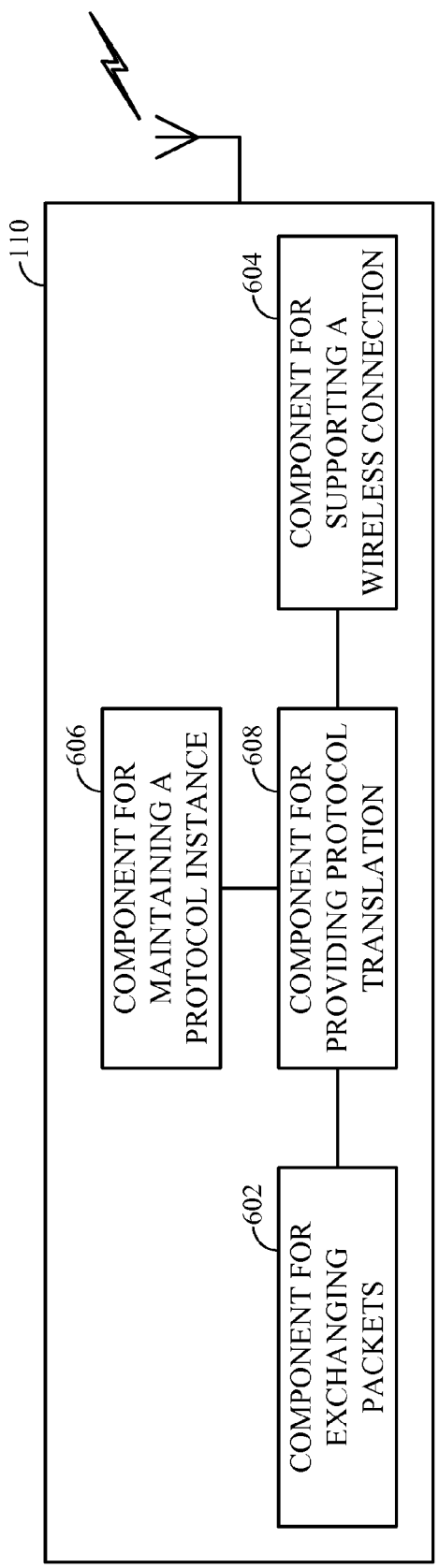
FIG. 6A is a conceptual block diagram illustrating the functionality of the wireless transceiver and processor of FIG. 5 in a transceiver function of an access point.

FIG. 6A is a conceptual block diagram illustrating the functionality of the wireless transceiver and processor of FIG. 5 in a transceiver function of an access point. The transceiver function 110 includes component 602 for exchanging packets with a network function 112 in an access point. The transceiver function 110 also includes component 604 for supporting a wireless connection, component 606 for maintaining a protocol instance over the wireless connection, and component 608 for providing protocol translation between the packets and physical frames transported over the wireless connection.

Figure 6B:
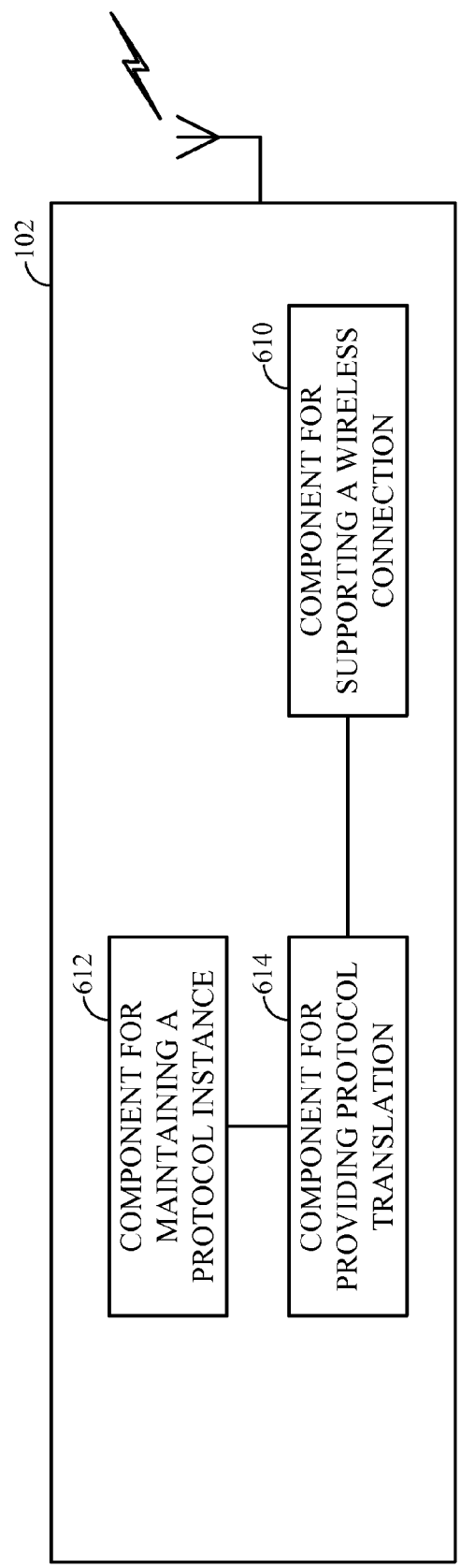
FIG. 6B is a conceptual block diagram illustrating the functionality of the wireless transceiver and processor of FIG. 5 in an access terminal.

FIG. 6B is a conceptual block diagram illustrating the functionality of the wireless transceiver and processor of FIG. 5 in an access terminal. The access terminal 102 includes component 610 for supporting a wireless connection with an access terminal, component 612 for maintaining a protocol instance over the wireless connection, and component 614 for providing protocol translation between the packets and physical frames transported over the wireless connection.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An access point, comprising:
    a transceiver function; and
    a network function configured to route packets between a packet-based network and the transceiver function;
    wherein the transceiver function is configured to support a wireless connection and maintain a protocol instance over the wireless connection, the transceiver function being further configured to provide protocol translation between the packets and physical frames transported over the wireless connection, each of the physical frames including a header identifying the protocol instance performing the translation for the physical frame.

2. The access point of claim 1 wherein the protocol translation provided by the transceiver function is Radio Link Protocol (RLP).

3. The access point of claim 2 wherein the RLP instance maintained by the transceiver function over the wireless connection is separate and independent from RLP instances maintained by other access points.

4. The access point of claim 3 wherein the transceiver function is further configured to cover a plurality of sectors in a cellular region, the transceiver function being further configured to maintain the RLP instance with an access terminal when the access terminal is handed off between sectors.

5. The access point of claim 3 wherein the transceiver function is further configured to include a RLP instance identifier in the header to identify the RLP instance performing the translation for the physical frame.

6. The access point of claim 3 wherein the transceiver function is further configured to exclude a RLP instance identifier from the header to identify the RLP instance maintained by the transceiver as the RLP instance performing the translation for the physical frame.

7. The access point of claim 3 wherein the transceiver function is further configured to include in the header sequence space information, the sequence space being separate and independent from sequence space for other access points.

8. The access point of claim 3 wherein the transceiver function is configured to exchange physical frames for the RLP instance with a second access point following the handoff of an access terminal to the second access point.

9. The access point of claim 8 wherein the network function is configured to route packets between the packet-based network and the second access point following the handoff of the access terminal to the second access point.

10. The access point of claim 1 wherein the transceiver function is further configured to compress the packets received from the network function.

11. The access point of claim 1, wherein the protocol instance corresponds to a particular communication session between the transceiver function and a remote entity.

12. The access point of claim 1, wherein the header includes a protocol instance identification field.

13. A method of communications by an access point having a network function and a transceiver function, comprising:
using the network function to route packets between a packet-based network and the transceiver function;
supporting a wireless connection;
using the transceiver function to maintain a protocol instance over the wireless connection and provide protocol translation between the packets and physical frames transported over the wireless connection, each of the physical frames including a header identifying the protocol instance performing the translation for the physical frame.

14. The method of claim 13 wherein the protocol translation provided by the transceiver function is Radio Link Protocol (RLP).

15. The method of claim 14 wherein the RLP instances maintained by the transceiver function over the wireless connection is separate and independent from RLP instances other access points.

16. The method of claim 15 wherein the a RLP instance identifier is excluded from the header to identify the RLP instance maintained by the transceiver as the RLP instance performing the translation for the physical frame.

17. The method of claim 15 wherein the header includes sequence space information, the sequence space being separate and independent from sequence space for other access points.

18. The method of claim 15 further comprising handing off of an access terminal to a second access point, and wherein the protocol translation further comprises exchanging physical frames for the RLP instance with the second access point.

19. The method of claim 18 further comprising using the network function to route packets between the packet-based network and the second method.

20. The method of claim 13 further comprising using the transceiver function to compress the packets received from the network function.

21. The method of claim 15 wherein the transceiver function is further configured to cover a plurality of sectors in a cellular region, the method further comprising maintaining the RLP instance with an access terminal when the access terminal is handed off between sectors.

22. The method of claim 15 wherein the header includes a RLP instance identifier to identifier the RLP instance performing the translation for the physical frame.

23. A transceiver function, comprising:
means for exchanging packets with a network function in an access point;
means for supporting a wireless connection;
means for maintaining a protocol instance over the wireless connection; and
means for providing protocol translation between the packets and physical frames transported over the wireless connection, each of the physical frames including a header identifying the protocol instance performing the translation for the physical frame.

24. The transceiver function of claim 23 wherein the protocol translation provided by the transceiver function is Radio Link Protocol (RLP).

25. The transceiver function of claim 22 wherein the RLP instance maintained over the wireless connection is separate and independent from RLP instances maintained by other access points.

26. The transceiver function of claim 25 wherein a RLP instance is excluded from the header to identify the RLP instance maintained by the means for maintaining a protocol instance as the RLP instance performing the translation for the physical frame.

27. The transceiver function of claim 25 wherein the header includes sequence space information, the sequence space being separate; and independent from sequence space for other access points.

28. The transceiver function of claim 25 wherein the means for providing protocol translation further comprises means for exchanging physical frames for the RLP instance with a second access point following the handoff of an access terminal to the second access point.

29. The transceiver function of claim 23 further comprising means for compressing the packets received from the network function.

30. The transceiver function of claim 25 wherein the header includes a RLP instance identifier to identify the RLP instance performing the translation for the physical frame.

31. The transceiver function of claim 25 further comprising means for covering a plurality of sectors in a cellular region, and wherein the means for providing protocol translation further comprises means for maintaining the RLP instance with an access terminal when the access terminal is handed off between sectors.

32. Computer-readable storage medium containing a set of instructions executable by a processor in a transceiver function, wherein the computer-readable storage medium is a physical medium, the instructions comprising:
 code for exchanging packets with a network function in an access point;
 code for supporting a wireless connection;
 code for maintaining a protocol instance over the wireless connection;
 and code for providing protocol translation between the packets and physical frames transported over the wireless connection, each of the physical frames including a header identifying the protocol instance performing the translation for the physical frame.

33. The computer-readable storage medium of claim 32 wherein the protocol translation is Radio Link Protocol (RLP).

34. The computer-readable storage medium of claim 33 wherein the RLP instance over the wireless connection is separate and independent from RLP instances maintained by other access points.

35. The computer-readable storage medium of claim 34 wherein a RLP instance identifier is excluded from the header to identify the RLP instance maintained by the code for maintaining a protocol instance as the RLP instance performing the translation for the physical frame.

36. The computer-readable storage medium of claim 34 wherein the header includes sequence space information, the sequence space being separate and independent from sequence space for other access points.

37. The computer-readable storage medium of claim 34 wherein the code for providing protocol translation further comprises code for exchanging physical frames for the RLP instance with a second access point following the handoff of an access terminal to the second access point.

38. The computer-readable storage medium of claim 32 further comprising code for compressing the packets received from the network function.

39. The computer-readable storage medium of claim 34 further comprising code for covering a plurality of sectors in a cellular region, and wherein the code for providing protocol translation further comprises code for maintaining the RLP instance with an access terminal when the access terminal is handed off between sectors.

40. The computer-readable storage medium of claim 34 wherein the header includes a RLP instance identifier to identify a RLP instance performing the translation for the physical frame.

41. An access terminal, comprising:
 a transceiver configured to support a wireless connection; and
 a processor configured to maintain a protocol instance over the wireless connection separate and independent from protocol instances maintained by other access points, the processor being further configured to provide protocol translation between packets and physical frames transported over the wireless connection, each of the physical frames including a header identifying the protocol instance performing the translation for the physical frame.

42. The access terminal of claim 41 wherein the protocol translation provided by the transceiver function is Radio Link Protocol (RLP).

43. The access terminal of claim 42 wherein the processor is further configured to include a RLP instance identifier in the header to identify the RLP instance performing the translation for the physical frame.

44. The access terminal of claim 42 wherein the processor is further configured to exclude a RLP instance identifier from the header to identify the RLP instance maintained by the transceiver as the RLP instance performing the translation for the physical frame.

45. The access terminal of claim 42 wherein the processor is further configured to include in the header sequence space information, the sequence space being separate and independent from sequence space for other access points in communication with the access terminal.

46. The access terminal of claim 41 wherein the transceiver is further configured to support a second wireless connection with a second access point, and wherein the processor is further configured to maintain a second protocol instance, separate and independent from the protocol instance, over the second wireless connection, and provide protocol translation between packets and physical frames transported over the second wireless connection.

47. A method of communications by an access terminal, comprising:
 supporting a wireless connection with an access point;
 maintaining a protocol instance over the wireless connection separate and independent from protocol instances maintained by other access points; and
 providing protocol translation between packets and physical frames transported over the wireless connection, each of the physical frames including a header identifying the protocol instance performing the translation for the physical frame.

48. The method of claim 47 wherein the protocol translation provided by the transceiver function is Radio Link Protocol (RLP).

49. The method of claim 48 wherein the header includes a RLP instance identifier header to identify the RLP instance performing the translation for the physical frame.

50. The method of claim 48 wherein a RLP instance identifier is excluded from the header to identify the RLP instance maintained over the wireless connection as the RLP instance performing the translation for the physical frame.

51. The method of claim 48 wherein the header includes sequence space information, the sequence space being separate and independent from sequence space for other access points in communication with the access terminal.

52. The method of claim 47 further comprising supporting a second wireless connection with a second access point, maintaining a second protocol instance, separate and independent from the protocol instance, over the second wireless connection, and providing protocol translation between packets and physical frames transported over the second wireless connection.

53. A processor for use in an access terminal, comprising:
 means for supporting a wireless connection with an access point;
 means for maintaining a protocol instance over the wireless connection separate and independent from protocol instances maintained by other access points; and
 means for providing protocol translation between packets and physical frames transported over the wireless connection, each of the physical frames including a header identifying the protocol instance performing the translation for the physical frame.

54. The processor of claim 53 wherein a RLP instance identifier is excluded from the header to identify the RLP instance maintained over the wireless connection as the RLP instance performing the translation for the physical frame.

55. The processor of claim 53 wherein the header includes sequence space information, the sequence space being separate and independent from sequence space for other access points in communication with the access terminal.

56. The processor of claim 53 further comprising means for supporting a second wireless connection with a second access point, means for maintaining a second protocol instance, separate and independent from the protocol instance, over the second wireless connection, and means for providing protocol translation between packets and physical frames transported over the second wireless connection.

57. The processor of claim 53 wherein the protocol translation provided by the transceiver function is Radio Link Protocol (RLP).

58. The processor of claim 53 wherein the header includes a RLP instance identifier header to identify the RLP instance performing the translation for the physical frame.

59. Computer-readable storage medium containing a set of instructions executable by a processor in an access terminal, wherein the computer-readable storage medium is a physical medium, the instructions comprising: code for supporting a wireless connection with an access point;
   code for maintaining a protocol instance over the wireless connection separate and independent from protocol instances maintained by other access points; and
   code for providing protocol translation between packets and physical frames transported over the wireless connection, each of the physical frames including a header identifying the protocol instance performing the translation for the physical frame.

60. The computer-readable storage medium of claim 59 wherein the protocol translation provided by the transceiver function is Radio Link Protocol (RLP).

61. The computer-readable storage medium of claim 60 wherein the header includes sequence space information, the sequence space being separate and independent from sequence space for other access points in communication with the access terminal.

62. The computer-readable storage medium of claim 59 wherein the instructions further comprise code for supporting a second wireless connection with a second access point, code for maintaining a second protocol instance, separate and independent from the protocol instance, over the second wireless connection, and code for providing protocol translation between packets and physical frames transported over the second wireless connection.

63. The computer-readable storage medium of claim 60 wherein the header includes a RLP instance identifier header to identify the RLP instance performing the translation for the physical frame.

64. The computer-readable storage medium of claim 60 wherein a RLP instance identifier is excluded from the header to identify the RLP instance maintained over the wireless connection as the RLP instance performing the translation for the physical frame.

* * * * *